United States Patent
Yamamoto et al.

(10) Patent No.: US 8,998,283 B1
(45) Date of Patent: Apr. 7, 2015

(54) UTILITY VEHICLE

(71) Applicant: Kawasaki Jukogyo Kabushiki Kaisha, Hyogo (JP)

(72) Inventors: Teruaki Yamamoto, Kakogawa (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/139,945

(22) Filed: Dec. 24, 2013

(51) Int. Cl.
*B60R 21/02* (2006.01)
*B60N 2/68* (2006.01)

(52) U.S. Cl.
CPC .................................. *B60N 2/68* (2013.01)

(58) Field of Classification Search
USPC ............ 296/24.34, 26.08, 26.09, 26.1, 26.11, 296/183.1, 190.03, 3, 24.43; 280/756
See application file for complete search history.

(56) References Cited

U.S. PATENT DOCUMENTS

| | | | |
|---|---|---|---|
| 4,611,824 A * | 9/1986 | McIntosh ....................... 280/748 |
| 4,867,497 A * | 9/1989 | Jayne ................................ 296/3 |
| 6,994,388 B2 | 2/2006 | Saito et al. |
| 8,668,124 B2 * | 3/2014 | Kennedy et al. .............. 224/403 |
| 2003/0011180 A1 * | 1/2003 | Coffman et al. ............... 280/748 |
| 2005/0052055 A1 * | 3/2005 | Cole ......................... 296/190.03 |
| 2005/0093320 A1 * | 5/2005 | Brauer et al. ...................... 296/3 |
| 2008/0048429 A1 * | 2/2008 | German ......................... 280/770 |

* cited by examiner

*Primary Examiner* — Jason S Morrow
(74) *Attorney, Agent, or Firm* — Wenderoth, Lind & Ponack, L.L.P.

(57) ABSTRACT

A utility vehicle is equipped with a passenger space, a cargo bed disposed behind the passenger space, and a screen disposed between the passenger space and the cargo bed. The screen is formed into a lattice shape using an outer frame made of a square pipe, a plurality of vertical cross-piece members made of square pipes, and a plurality of horizontal cross-piece members made of square pipes.

4 Claims, 7 Drawing Sheets

UTILITY VEHICLE

BACKGROUND OF THE INVENTION

1. Field of the Invention

The present invention relates to a utility vehicle equipped with a passenger space, a cargo bed, and a screen disposed between the passenger space and the cargo bed.

2. Description of the Prior Art

Figure 8:
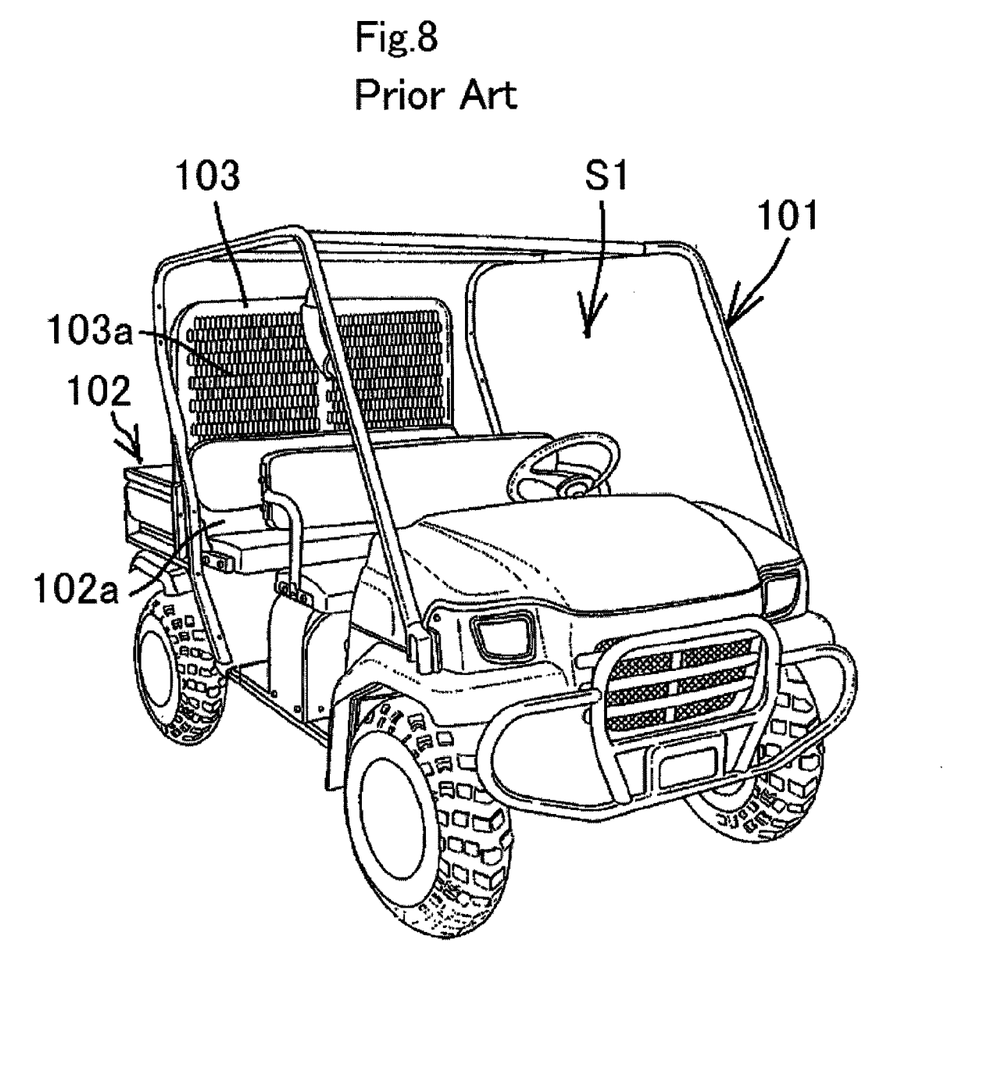
FIG. 8 is a perspective view showing the conventional utility vehicle.

FIG. 8 shows a conventional utility vehicle described in U.S. Pat. No. 6,994,388 and is equipped with a passenger space (riding space) S1 enclosed with a R.O.P.S. (Roll Over Protective Structure) 101, a cargo bed 102, and a screen 103 serving as a partition between the passenger space S1 and the cargo bed 102. The state of the cargo bed 102 can be changed between an expanded state and a non-expanded state.

The screen 103 is integrated with the front panel 102a of the cargo bed 102 and is formed of a plate member made of metal or resin and having numerous openings 103a. Furthermore, as the state of the cargo bed 102 is changed between the expanded state and the non-expanded state, the screen 103 is moved in the front-rear direction of the vehicle together with the front panel 102a of the cargo bed 102.

The numerous openings 103a formed in the screen 103 make it possible for the occupants of the vehicle to confirm the rearward view of the vehicle.

However, as shown in FIG. 8, if the screen 103 is formed of a single plate member, more particularly, a metallic plate member, the weight of the screen 103 becomes heavy and difficult to handle. For example, when the screen 103 is moved in the front-rear direction or mounted, two workers hold both the end portions of the screen in the width direction of the vehicle and move the screen, thereby taking time and labor for handling the screen.

SUMMARY OF THE INVENTION

In consideration of the above-mentioned problems, an object of the present invention is to provide a utility vehicle having a screen being light in weight, easy to handle and easy to have good rearward visibility.

In order to achieve the above-mentioned object, a utility vehicle according to the present invention is equipped with a passenger space, a cargo bed disposed behind the passenger space, and a screen disposed between the passenger space and the cargo bed. The screen is formed into a lattice shape using an outer frame made of a square pipe, a plurality of vertical cross-piece members made of square pipes, and a plurality of horizontal cross-piece members made of a square pipes.

With the above-mentioned configuration, it is possible to provide a screen having high rigidity without increasing the weight of the screen, and it is also possible to ensure good rearward visibility.

The utility vehicle having the above-mentioned configuration can preferably have the following configurations.

(1) The above-mentioned utility vehicle is further equipped with a R.O.P.S. enclosing the passenger space and a front seat and a rear seat disposed inside the passenger space. The cargo bed has a front panel integrated with the screen, the state of the cargo bed can be changed between an expanded state in which the cargo bed is expanded forward into the passenger space and a non-expanded state in which the cargo bed does not occupy the passenger space, and the position of the screen in the front-rear direction is changeable between the expanded state and the non-expanded state of the cargo bed.

Hence, the screen and the front panel can be moved simultaneously in the utility vehicle having the cargo bed capable of being expanded forward.

(2) The outer frame, the vertical cross-piece members and the horizontal cross-piece members have a rectangular shape being long in the front-rear direction. Hence, the rearward visibility can be improved while weight reduction is attained.

(3) The plurality of vertical cross-piece members and the plurality of horizontal cross-piece members are positioned within the width of the outer frame in the front-rear direction as viewed from the side of the vehicle. Hence, the passenger space can be expanded rearward, and the spaces on the rear sides of occupants on the rear seat can be obtained securely.

(4) The screen has a stand protruding forward from the lower end of the front panel, and the anchors and retractors of two or three sets of three-point seat belt devices for rear seat use are provided on the screen and the stand. Hence, for example, when the state of the cargo bed is changed between the expanded state and the non-expanded state, the mounting portions of the seat belt devices can be moved easily in the front-rear direction together with the screen.

The structure having the stand as described in the above-mentioned configuration (4) can further preferably have the following configurations (5) to (7).

(5) Support members extending forward and downward are connected to both the end portions of the outer frame in the width direction of the vehicle, and the lower end portions of the respective support members are connected to the front portions of both the end portions of the stand in the width direction of the vehicle.

(6) The stand has a sled that slides on the bottom plate of the cargo bed. Hence, the screen can be moved by applying a slight operation force.

(7) The stand has a stand frame and a plurality of reinforcing stays for connecting members inside the stand frame.

DETAILED DESCRIPTION OF THE PREFERRED EMBODIMENTS

Figure 1:
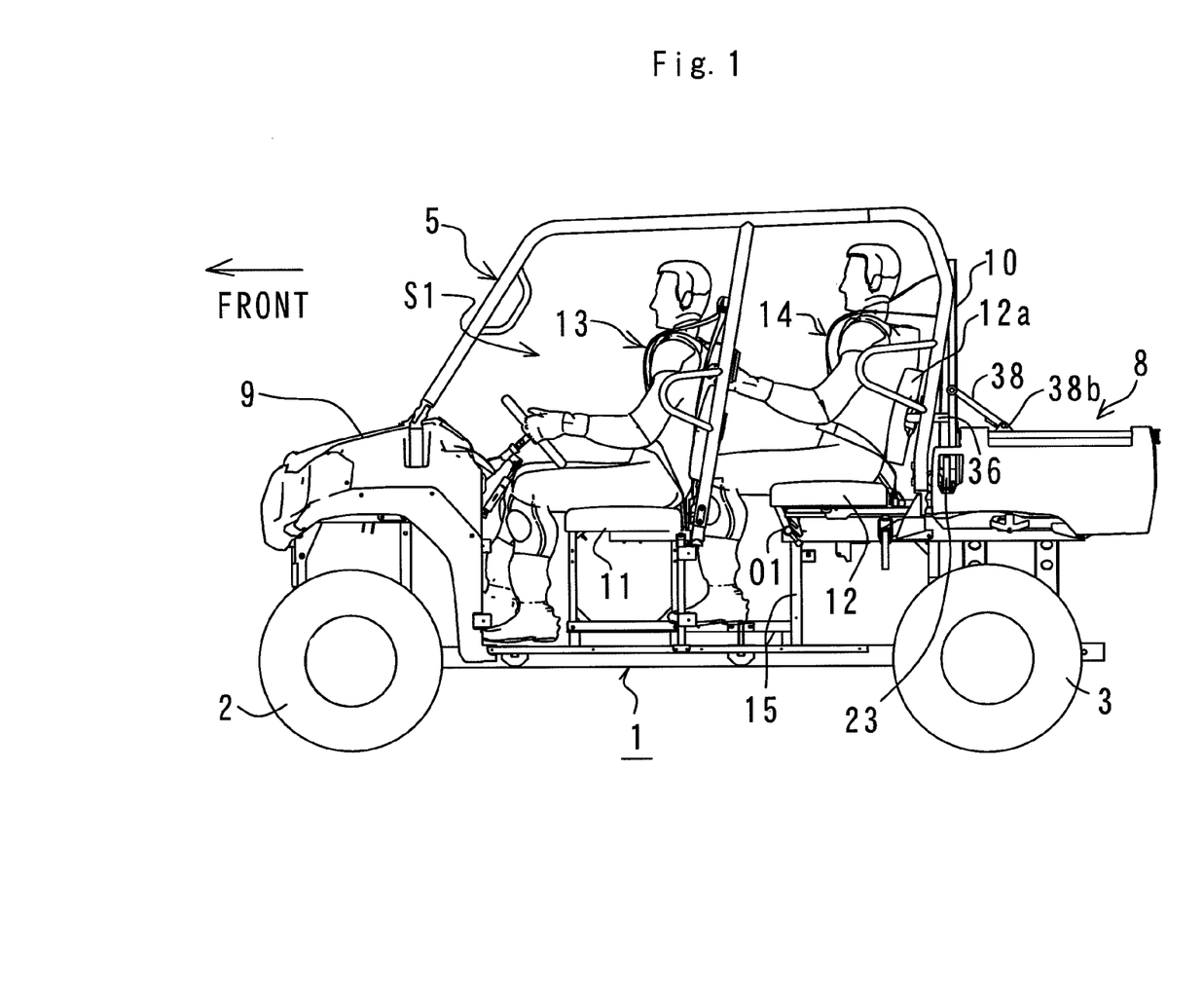
FIG. 1 is a left side view showing a utility vehicle according to the present invention.

On the basis of FIGS. 1 to 7, an embodiment of a utility vehicle according to the present invention will be described. For convenience of explanation, the left-right direction as viewed by the occupants of the vehicle is explained as the left-right direction of the vehicle and the components thereof. In FIG. 1, the utility vehicle is equipped with a pair of front wheels 1 on the front side of a vehicle body 1, a pair of rear wheels 2 on the rear side of the vehicle body 1, and a passenger space (cabin) between the front wheels 2 and the rear wheels 3. The passenger space S1 is enclosed with a R.O.P.S. 5. The term R.O.P.S. is an acronym for roll-over protective structure. Furthermore, the utility vehicle is equipped with a cargo bed 8 behind the passenger space S1, a bonnet 9 in front of the passenger space S1, and a screen 10 between the passenger space S1 and the cargo bed 8.

A bench-type front seat 11 is installed on the front half portion of the passenger space S1, and a retractable bench-type rear seat 12 is installed on the rear half portion of the passenger space S1. In the embodiment, the bench-type front seat 11 and the bench-type rear seat 12 are a triple occupant seat (three-seater) and equipped with three sets of three-point seat belt devices 13 and 14, respectively. The rear seat 12 is rotatably supported by the upper end portions of support legs 15 and can be retracted when rotated forward around its turning axis O1. On the other hand, the backrest 12a of the rear seat 12 is supported by the backrest support member 36 provided for the screen 10. However, the front seat 11 and the rear seat 12 are not limited to a bench type, and a utility vehicle equipped with independent seats is also included in the present invention.

Figure 2:
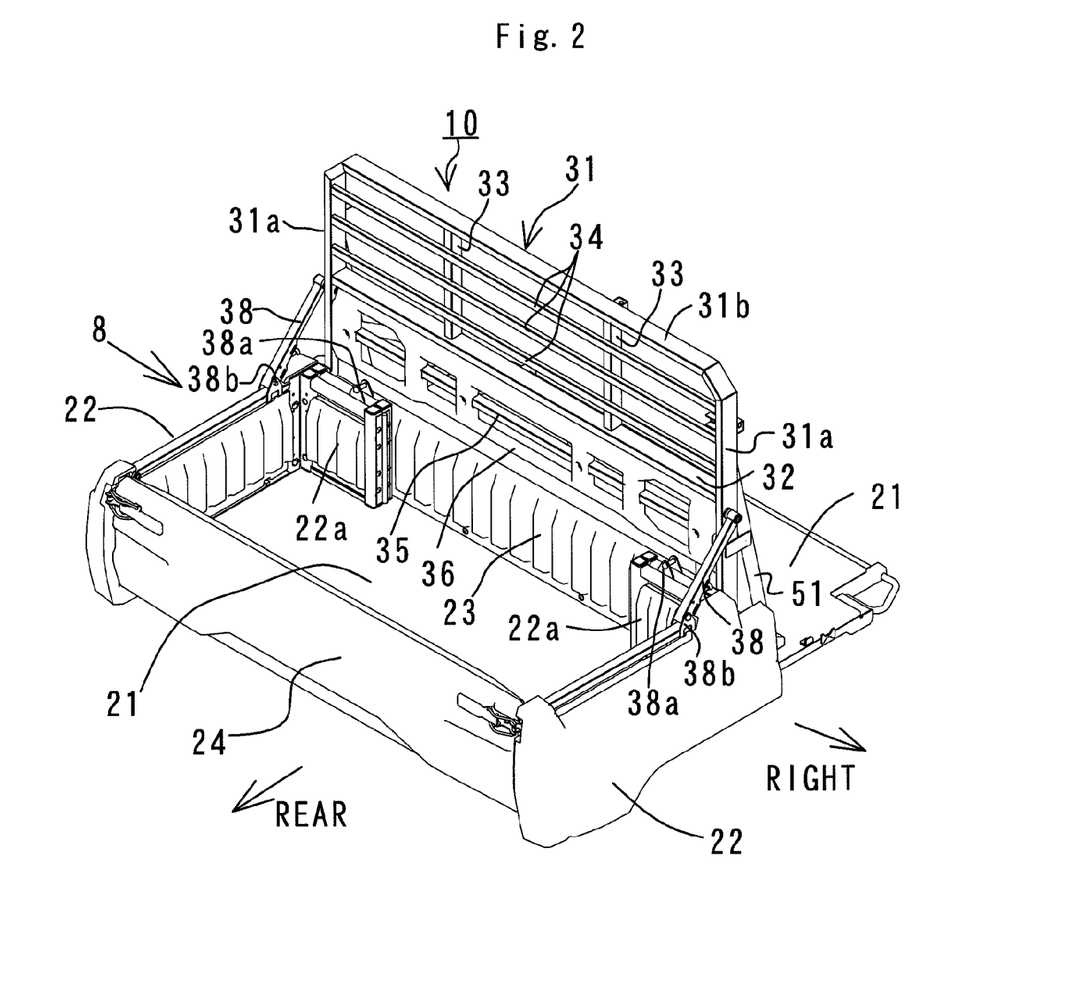
FIG. 2 is a perspective view showing a cargo bed in its non-expanded state and a screen shown in FIG. 1, seen from rear and above.

In FIG. 2, the cargo bed 8 is composed of a bottom plate 21, a pair of left and right side panels 22, a front panel 23, and a tail panel 24. The front panel 23 is integrated with the screen 10 at the lower end portion of the screen 10 and is movable in the front-rear direction together with the screen 10. Each side panel 22 has a foldable extension portion 22a at its front end portion.

Figure 3:
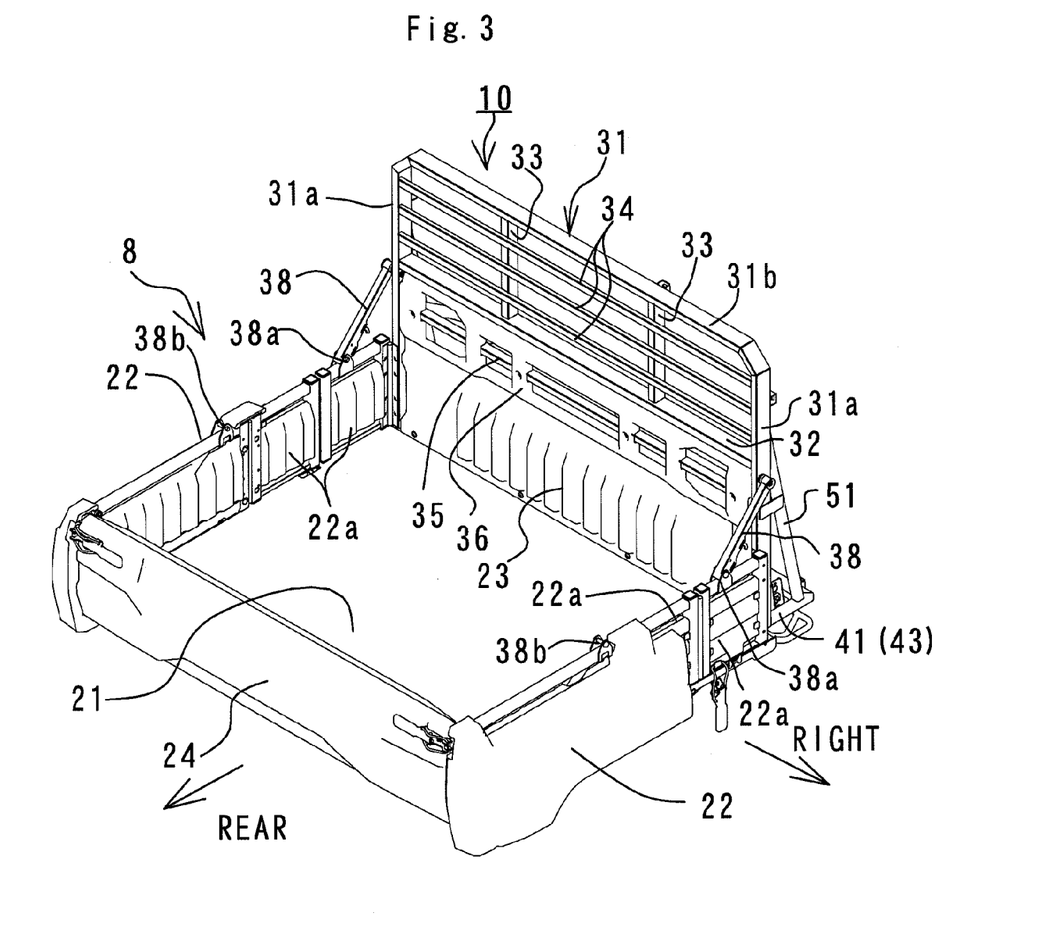
FIG. 3 is a perspective view showing the cargo bed in its expanded state and the screen shown in FIG. 1, seen from rear and above.

As shown in FIG. 3, the cargo bed 8 can be expanded forward by widening (extending) the foldable extension portions 22a of the side panels 22 linearly in the front-rear direction and by moving the screen 10 and the front panel 23 forward.

In FIG. 3, the screen 10 is equipped with an outer frame 31 having a substantially U shape, a cross member 32 provided at the substantially central portion of the width of the outer frame 31 in the up-down direction, a plurality of vertical cross-piece members 33 and a plurality of horizontal cross-piece members 34 disposed in the upper half portion of the outer frame 31, and a sub-cross member 35 and the support member 36 disposed in the lower half portion of the outer frame 31.

The outer frame 31 is integrally equipped with a pair of left and right pillar portions 31a and an upper beam portion 31b for integrally connecting the upper end portions of both the pillar portions 31a and is made by bending and forming a single square pipe. The lower end portions of both the pillar portions 31a are extended downward to the bottom plate 21 of the cargo bed 8, and the front panel 23 of the cargo bed 8 is installed at the lower end portions of both the pillar portions 31a as described above. Furthermore, support stays 38 are rotatably supported by the respective pillar portions 31a. Each of the support stays 38 is extended downward and rearward and is detachably engaged with an engagement portion 38a for cargo bed expansion on the upper face of the foldable extension portion 22a of the side panel 22. The engagement portion 38a is used when the cargo bed is expanded. An engagement portion 38b for cargo bed non-expansion is provided on the upper face of the side panel 22 at a certain distance behind the engagement portion 38a for cargo bed expansion.

The vertical cross-piece members 33 and the horizontal cross-piece members 34 of the screen 10 are each made of a metal pipe having a substantially rectangular shape in cross-section. The screen 10 according to the embodiment is equipped with the two vertical cross-piece members 33 and the three horizontal cross-piece members 34. The two vertical cross-piece members 33 are disposed between the left and right pillar portions 31a at intervals in the width direction of the vehicle. The upper end of each vertical cross-piece member 33 is secured to the upper beam portion 31b of the outer frame 31 by welding, and the lower end of each vertical cross-piece member 33 is secured to the cross member 32 by welding. The three horizontal cross-piece members 34 are disposed at nearly equal intervals between the upper beam portion 31b and the cross member 32 in the up-down direction. The left and right end portions of each horizontal cross-piece member 34 are secured to the left and right pillar portions 31a, respectively, by welding. In addition, the vertical cross-piece member 33 is secured to the front faces of the horizontal cross-piece members 34 by welding at portions intersecting the horizontal cross-piece members 34. As describe above, the upper half portion of the screen 10 is formed into a lattice or grid shape using the two vertical cross-piece members 33 and the three horizontal cross-piece members 34, and the respective openings separated by the outer frame 31, the vertical cross-piece members 33 and the horizontal cross-piece members 34 have a substantially rectangular shape being long in the width direction of the vehicle.

Figure 4:
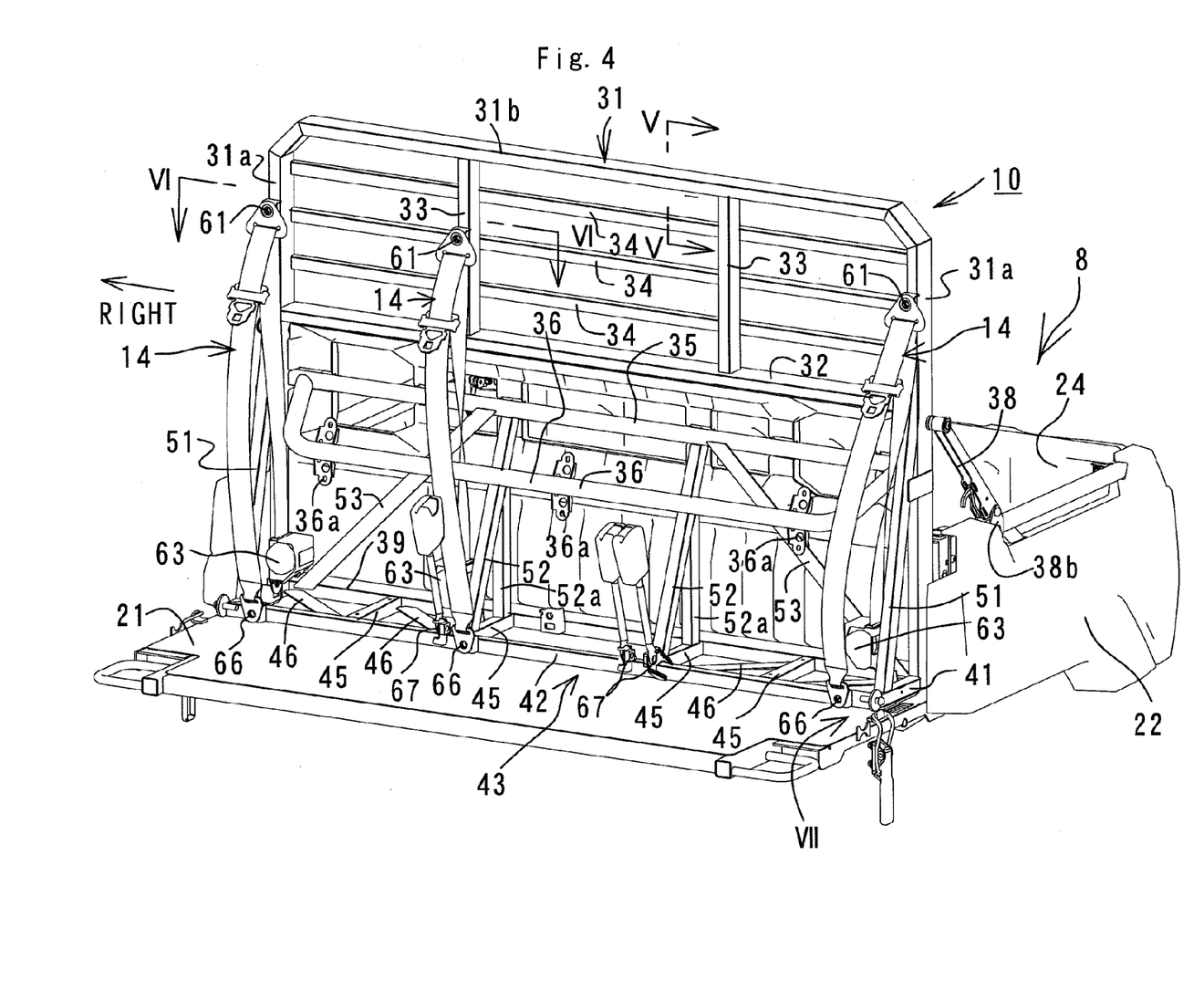
FIG. 4 is a perspective view showing the cargo bed in the non-expanded state and the screen shown in FIG. 1, seen from front and above.

In FIG. 4, an upper anchor 61 for seat belt support is installed in each of the left and right pillar portions 31a of the outer frame 31 and in the left vertical cross-piece member 33. A backrest support member 36 protruding forward and downward in a substantially U shape is secured to the sub-cross member 35 by welding. Three backrest support brackets 36a are secured to the backrest support member 36 at intervals in the width direction of the vehicle.

The lower ends of both the pillar portions 31a are connected using a lower beam member 39 made of a metal pipe and extended in the width direction of the vehicle. Both the end portions of the lower beam member 39 in the width direction of the vehicle are secured to the respective pillar portions 31a by welding. In addition, side pipes 41 for stand use extending forward are integrally secured to the lower ends of both the pillar portions 31a by welding, and the front end portions of both the side pipes 41 are connected using a front pipe 42 for stand use extending in the width direction of the vehicle. Both the end portions of the front pipe 42 in the width direction of the vehicle are secured to the front end portions of the side pipe 41 by welding. In other words, a stand frame 43 having a substantially rectangular shape in planar view is composed of the pair of side pipes 41, the front pipe 42 and the lower beam member 39.

The lower beam member 39 and the front pipe 42 are also connected using four reinforcing stays 45 disposed at intervals in the width direction of the vehicle. The front and rear end portions of each reinforcing stay 45 are secured to the front pipe 42 and the lower beam member 39, respectively, by welding. Furthermore, to the stand frame 43, a plurality of diagonal auxiliary plates 46 are secured to provide a truss structure.

Both the pillar portions 31a and the front end portions of the side pipes 41 are connected using two first support members 51 inclined rearward with respect to the vertical line to prevent the screen 10 from tilting forward. Both the upper and lower end portions of each of the first support members 51 are secured to the pillar portion 31a and the side pipe 41, respectively, by welding. Furthermore, the front pipe 42 and the sub-cross member 35 are connected using two second support members 52 inclined rearward with respect to the vertical line. Both the upper and lower ends of each second support member 52 are secured to the sub-cross member 35 and the front pipe 42, respectively, by welding. The two second support members 52 are supported from below by auxiliary pipes 52a being substantially vertical. Furthermore, the two second support members 52 are disposed in the width direction of the vehicle at positions substantially corresponding to the two reinforcing stays 45 disposed inward in the width direction of the vehicle among the four reinforcing stays 45.

A third support member 53 extended extending upward and inward in the width direction of the vehicle is secured to the rear end portion of each side pipe 41 by welding, and the upper end portion of the third support member 53 is secured to the sub-cross member 35 by welding. The position of the upper end portion of the third support member 53 is located in the neighborhood of the upper end portion of the second support member 52.

In the structure for mounting the seat belt device 14 for rear seat use, the upper anchor 61 for seat belt use is provided at each of the left and right pillar portions 31a of the outer frame 31 and at the right vertical cross-piece member 33. Three retractors 63 for seat belt use are respectively provided at positions corresponding to both the end portions of the stand frame 43 in the width direction of the vehicle and at a position corresponding to the second reinforcing stay 45 from the right. Three lower anchors 66 and three buckle mounting portions 67 for seat belt use are respectively provided on the front pipe 42 of the stand frame 43. In other words, the anchors 61 and 66 for supporting the seat belt devices 14, the buckle mounting portions 67 and the retractors 63 are all provided on the screen 10 and the stand frame 43.

Figure 5:
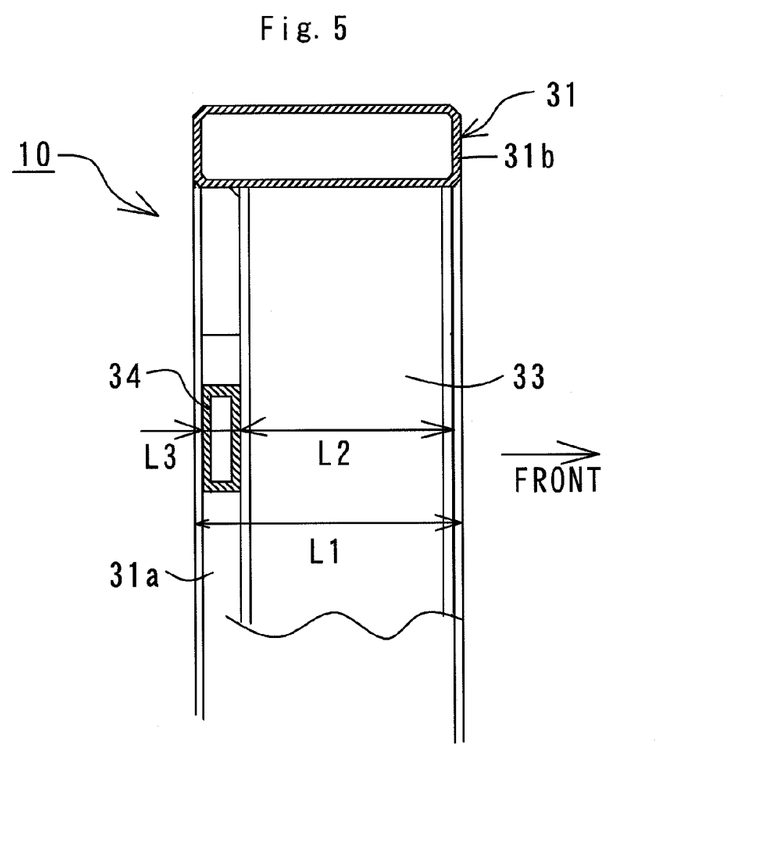
FIG. 5 is an enlarged sectional view showing the screen, taken on line V-V of FIG. 4 (an enlarged vertical sectional view)

FIG. 5 is a sectional view showing the screen 10, taken on line V-V of FIG. 4. The vertical cross-section of the upper beam portion 31b of the outer frame 31 has a substantially rectangular shape being long in the front-rear direction, and the vertical cross-section of the horizontal cross-piece member 34 has a substantially rectangular shape being long in the up-down direction. The rear face of the horizontal cross-piece member 34 is positioned in the same plane as that of the rear face of the outer frame 31 or slightly forward therefrom. The width L3 of the horizontal cross-piece member 34 in the front-rear direction is set so as to be shorter (for example, approximately ½ to ⅙) than the width L1 of the outer frame 31 in the front-rear direction. Hence, the horizontal cross-piece member 34 is confined within the width L1 of the outer frame 31 in the front-rear direction as viewed from the side of the vehicle.

Figure 6:
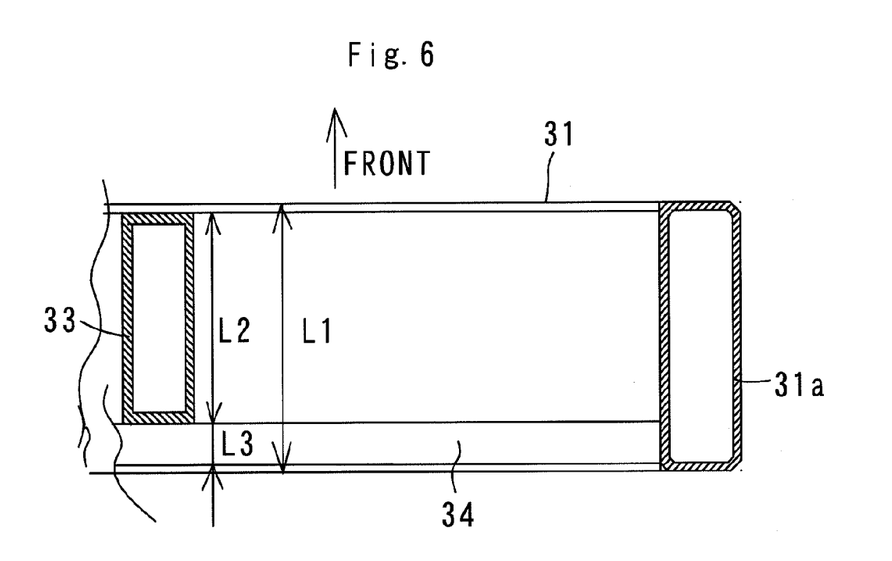
FIG. 6 is an enlarged sectional view showing the screen, taken on line VI-VI of FIG. 4 (an enlarged horizontal sectional view)

FIG. 6 is an enlarged sectional view showing the screen 10, taken on line VI-VI of FIG. 4. The horizontal cross-section of the pillar portion 31a of the outer frame 31 has a substantially rectangular shape being long in the front-rear direction, and the horizontal cross-section of the vertical cross-piece member 33 has a substantially rectangular shape being long in the front-rear direction. The vertical cross-piece member 33 is disposed on the front face of the horizontal cross-piece member 34 as described above. The width L2 of the vertical cross-piece member 33 in the front-rear direction is shorter than the width L1 of the outer frame 31 in the front-rear direction, and the total value of the width L2 of the vertical cross-piece member 33 in the front-rear direction and the width L3 of the horizontal cross-piece member 34 in the front-rear direction is also shorter than the width L1 of the outer frame 31 in the front-rear direction. Hence, the vertical cross-piece members 33 and the horizontal cross-piece members 34 are all confined within the width L1 of the outer frame 31 in the front-rear direction as viewed from the side of the vehicle.

Figure 7:
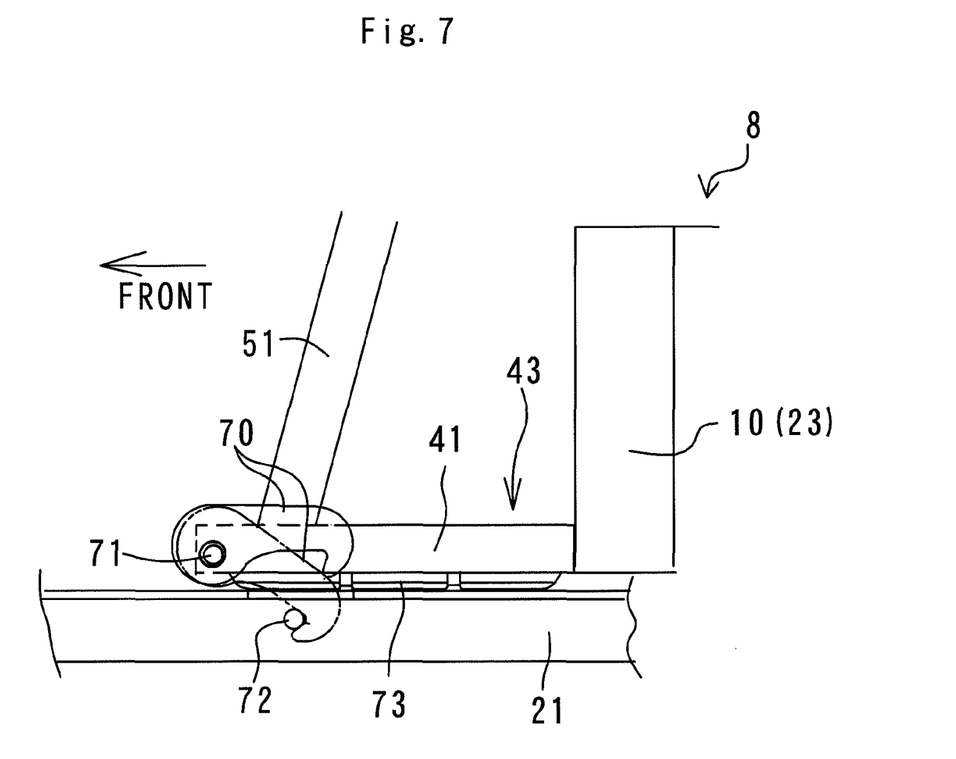
FIG. 7 is an enlarged view showing the portion indicated by the arrow VII of FIG. 4.

FIG. 7 is an enlarged side view showing the side end portion of the stand frame 43, and a support shaft 71 is provided at the front end portion of the side pipe 41 of the stand frame 43, and a lock hook 70 extended rearward is supported by this support shaft 71 so as to be rotatable in the up-down direction. On the other hand, an engagement pin 72 is provided on the side face of the bottom plate 21 of the cargo bed 8. The screen 10 and the front panel 23 can be secured to a predetermined cargo bed expansion position by engaging the lock hook 70 with the engagement pin 72. Furthermore, a sled 73 made of resin is secured to the lower face of the side pipe 41.

Operations regarding the retraction of the rear seat 12, the expansion of the cargo bed 8 and the movement of the screen 10 will be described briefly.

FIG. 1 shows the cargo bed 8 in the non-expanded state, and the rear seat 12 in a state in which occupants can sit thereon. The screen 10 is located together with the front panel 23 of the cargo bed 8 at the non-expansion position thereof on the rear side. The rear seat 12 is folded forward from the state shown in FIG. 1, and the lower end portions of the support stays 38 are released from the engagement portions 38b of the side panels 22, and then the screen 10 and the front panel 23 are moved forward integrally. At this time, since the screen 10 has a lattice or grid shape, the worker can easily grasp the arbitrary position of the screen. The foldable extension portion 22a of the side panel 22 is expanded linearly as shown in FIG. 3 by moving the screen 10 and the front panel 23 forward as described above. Furthermore, when the screen 10 and the front panel 23 are moved, the sled 73 of the stand frame 43 slides on the upper face of the bottom plate 21 as shown in FIG. 7.

When the screen 10 and the front panel 23 are moved forward to the cargo bed expansion position, the lock hook 70 is engaged with the engagement pin 72 as shown in FIG. 7, whereby the screen 10, the front panel 23 and the side panel 22 are secured in their expanded states.

Advantage of the Embodiment (1) Since the screen 10 is formed into a lattice or grid shape by combining the outer frame 31 made of a square pipe, the plurality of vertical cross-piece members 33 made of square pipes and the plurality of horizontal cross-piece members 34 made of square pipes, it is possible to provide the screen 10 having high rigidity without increasing its weight. In addition, since it is possible to form a plurality of large openings in the screen, good rearward visibility can be maintained.

2) Since the vertical cross-piece member 33 and the horizontal cross-piece member 34 are confined within the width L1 of the outer frame 31 in the front-rear direction as viewed from the side of the vehicle, it is possible to securely obtain the volume of the passenger space S1 in front of the screen 10. In particular, the horizontal cross-piece member 34 is disposed in the rear portion of the width L1 of the outer frame 31 in the front-rear direction, the vertical cross-piece member 33 is disposed in the front portion of the width L1, and the screen 10 is divided by the two vertical cross-piece members 33 into three regions in the width direction of the vehicle, that is, left, right and central regions. With this structure, the respective three occupants on the triple rear seat 12 can securely obtain rear spaces without being interfered with by the vertical cross-piece members 33.

3) Since the anchors 61 and 66, the buckle mounting portion 67 and the retractor 63 of the seat belt device 14 for rear seat use are all provided on the screen 10 and the stand frame 43, when the state of the cargo bed 8 is changed between the non-expanded state and the expanded state, the support portions, the mounting portions, etc. for seat belt use can be moved easily in the front-rear direction together with the screen 10.

4) Since the sled 73 is provided on the lower face of the stand frame 43, the integrated combination of the screen 10 and the stand frame 43 can be moved by applying a slight operation force.

(5) Since the screen 10 is supported on the stand frame 43 using the plurality of support members 51 extended forward and downward from the screen 10, when the screen 10 is moved in the front-rear direction, the screen 10 can be moved smoothly without being deflected.

Other Embodiments (1) The present invention is also applicable to a utility vehicle in which its rear seat is stationary and its cargo bed cannot be expanded, (2) The present invention is also applicable to a utility vehicle in which independent seats are used as a front seat and a rear seat, instead of bench-type seats.

(3) The present invention is also applicable to a utility vehicle in which no rear seat is provided and its cargo bed is provided immediately behind its front seat.

(4) The present invention is not limited to the structure of the above-mentioned embodiment, and includes various modifications conceivable within the range not departing from the contents of the claims.

What is claimed is:

1. A utility vehicle comprising:
    a passenger space;
    a cargo bed behind the passenger space; and
    a screen between the passenger space and the cargo bed, the screen being formed into a lattice shape including an outer frame made of a square pipe, a plurality of vertical cross-piece members made of square pipes, and a plurality of horizontal cross-piece members made of square pipes;
       wherein the screen has a stand protruding forward from a lower end of a front panel; and
       wherein anchors and retractors of two or three sets of three-point seat belt devices for rear seat use are provided on the screen and the stand.

2. The utility vehicle according to claim 1, further comprising support members extending forward and downward and connected to both end portions of the outer frame in a width direction of the vehicle;
    wherein lower end portions of the respective support members are connected to front portions of both end portions of the stand in the width direction of the vehicle.

3. The utility vehicle according to claim 1, further comprising the stand having a sled configured to slide on a bottom plate of the cargo bed.

4. The utility vehicle according to claim 1, further comprising a stand having the stand frame and a plurality of reinforcing stays for connecting members inside the stand frame.

* * * * *